US012570353B2

(12) United States Patent
LaPlante

(10) Patent No.: US 12,570,353 B2
(45) Date of Patent: *Mar. 10, 2026

(54) STEERING DECOUPLING DEVICE

(71) Applicant: Paul LaPlante, Palm Harbor, FL (US)

(72) Inventor: Paul LaPlante, Palm Harbor, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/954,429

(22) Filed: Nov. 20, 2024

(65) Prior Publication Data

US 2025/0074498 A1     Mar. 6, 2025

Related U.S. Application Data

(63) Continuation of application No. 18/355,293, filed on Jul. 19, 2023, now Pat. No. 12,172,694.

(60) Provisional application No. 63/391,211, filed on Jul. 21, 2022.

(51) Int. Cl.
  *B62D 1/20* (2006.01)
  *F16D 11/14* (2006.01)
(52) U.S. Cl.
  CPC ................ *B62D 1/20* (2013.01); *F16D 11/14* (2013.01)
(58) Field of Classification Search
  CPC .................................. B62D 1/20; F16D 11/14
  See application file for complete search history.

(56) References Cited

U.S. PATENT DOCUMENTS

| | | | |
|---|---|---|---|
| 4,261,452 A | 4/1981 | Barrows | |
| 4,768,634 A | 9/1988 | Quick et al. | |
| 6,059,085 A | 5/2000 | Farnsworth | |
| 11,104,371 B2 | 8/2021 | Yoshida et al. | |
| 11,607,779 B2 | 3/2023 | Soucy | |
| 11,891,107 B2 | 2/2024 | Partyka et al. | |
| 12,172,694 B2 * | 12/2024 | LaPlante | B62D 1/20 |
| 2022/0268323 A1 | 8/2022 | Bartus | |

FOREIGN PATENT DOCUMENTS

| | | |
|---|---|---|
| CN | 211336155 U | 8/2020 |
| EP | 0014219 A1 | 8/1980 |

OTHER PUBLICATIONS

International Search Report and Written Opinion Received for PCT Patent Application No. PCT/US2023/070532, mailed on Nov. 6, 2023, 7 pages.

* cited by examiner

*Primary Examiner* — Faye M Fleming
(74) *Attorney, Agent, or Firm* — Adler Pollock & Sheehan P.C.

(57)         ABSTRACT

A steering decoupling device includes an output clutch jaw, an input clutch jaw, a housing encompassing the output clutch jaw and the input clutch jaw, a thrust washer and a heavy-duty internal retaining ring for ensuring that the output clutch jaw is securely mounted within the housing, a disc spring residing within the housing configured to provide tension between the output clutch jaw and the input clutch jaw, an intermediate shaft that includes output clutch jaw, and a steering shaft that includes the input clutch jaw, the intermediate shaft and the steering shaft configured to translate relative to each other from a first position in which the output clutch jaw and the input clutch jaw are engaged to a second position in which the output clutch jaw and the input clutch jaw are disengaged.

1 Claim, 3 Drawing Sheets

STEERING DECOUPLING DEVICE

CROSS-REFERENCE TO RELATED APPLICATION

This application is a Continuation of U.S. patent application Ser. No. 18/355,293, filed Jul. 19, 2023, which claims priority benefit of U.S. Provisional Application No. 63,391, 211, filed Jul. 21, 2022, the disclosures of all of which are incorporated by reference in their entireties.

BACKGROUND OF THE INVENTION

The present invention relates generally to devices for use in automotive and industrial systems, and more particularly, to a steering decoupling device.

In general, automatic evasive steering maneuvers can outperform human-initiated steering maneuvers in emergency situations. A steering interface that decouples the steering wheel from the tires may enhance the efficiency of automatic steering maneuvers by providing full authority to the automation system.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In one aspect, the invention features a steering decoupling device including an output clutch jaw, an input clutch jaw, a housing encompassing the output clutch jaw and the input clutch jaw, and a thrust washer and a heavy-duty internal retaining ring for ensuring that the output clutch jaw is securely mounted within the housing.

In another aspect, the invention features a steering decoupling device including an output clutch jaw, an input clutch jaw, a housing encompassing the output clutch jaw and the input clutch jaw, a thrust washer and a heavy-duty internal retaining ring for ensuring that the output clutch jaw is securely mounted within the housing, a disc spring residing within the housing configured to provide tension between the output clutch jaw and the input clutch jaw, an intermediate shaft that includes output clutch jaw, and a steering shaft that includes the input clutch jaw, the intermediate shaft and the steering shaft configured to translate relative to each other from a first position in which the output clutch jaw and the input clutch jaw are engaged to a second position in which the output clutch jaw and the input clutch jaw are disengaged.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

These and other features, aspects, and advantages of the present invention will become better understood with reference to the following description, appended claims, and accompanying drawings where:

DETAILED DESCRIPTION OF THE PREFERRED EMBODIMENT(S)

Figures 1, 2:
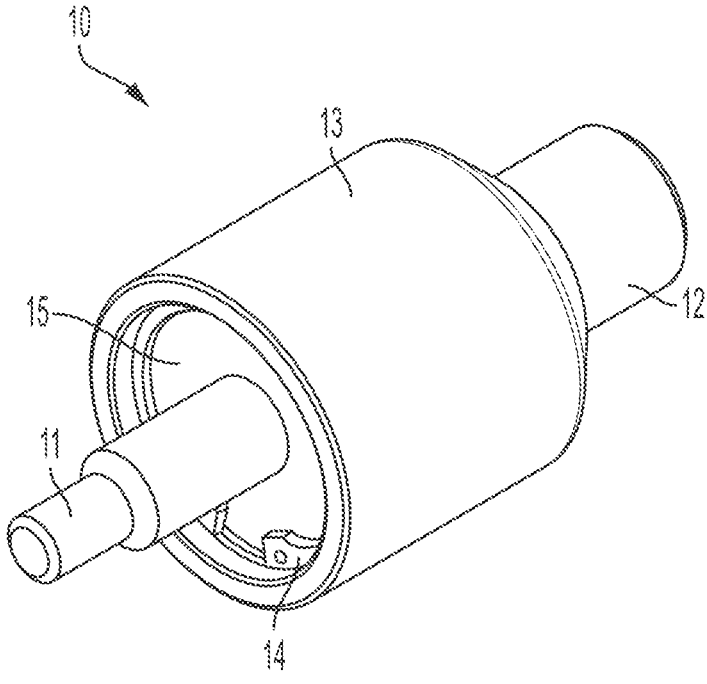
FIG. 1 is a perspective view of a steering decoupling device according to an embodiment.
FIG. 2 is a front view of the steering decoupling device of FIG. 1.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

Fully described herein is a steering decoupling device that enables recoupling in perfect orientation to an original orientation prior to a decoupling action. The benefits of the present invention include, without limitation, reducing or eliminating injuries that may be sustained in the automotive or industrial systems without the use of such device and its application thereof in the system.

The decoupler device of the present invention allows perfect recoupling orientation. This feature aids in systems, such as steering wheels, for vehicles when switching from autonomous to operator controlled.

In FIG. 1, a perspective view of an exemplary steering decoupling device 10 according to an embodiment of the present disclosure is shown. The steering decoupling device 10 includes an output clutch jaw 11 and an input clutch jaw 12. The jaws 11, 12 may be encompassed within a housing 13. Adjacent the output clutch jaw 11 includes a thrust washer 15 and a heavy-duty internal retaining ring 14 for ensuring that the output clutch jaw 11 is securely mounted within the housing 13.

In FIG. 2, a front view of the steering decoupling device 10 of FIG. 1 as viewed from the output clutch jaw 11 side received within the housing 13 and the input clutch jaw 12 being hidden in the back.

Figure 3:
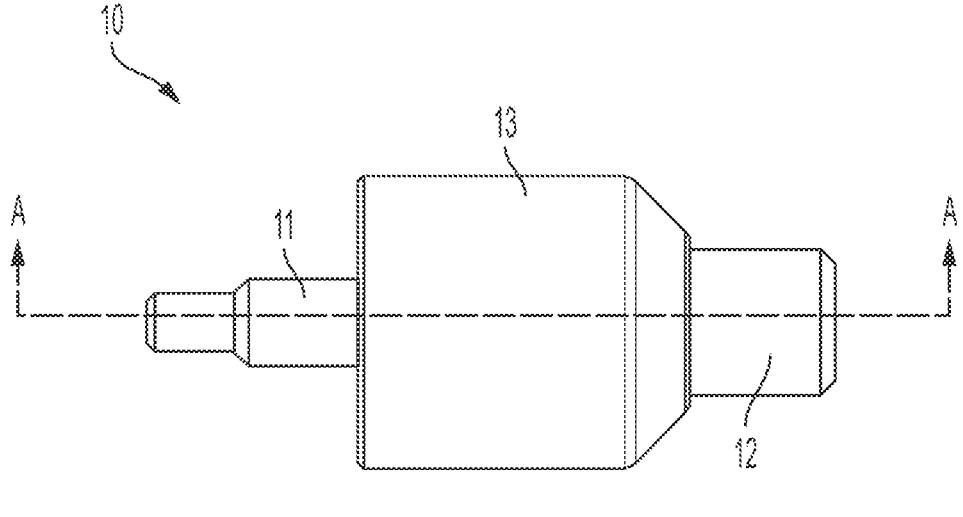
FIG. 3 is a side view of the steering decoupling device of FIG. 1.
Figure 4:
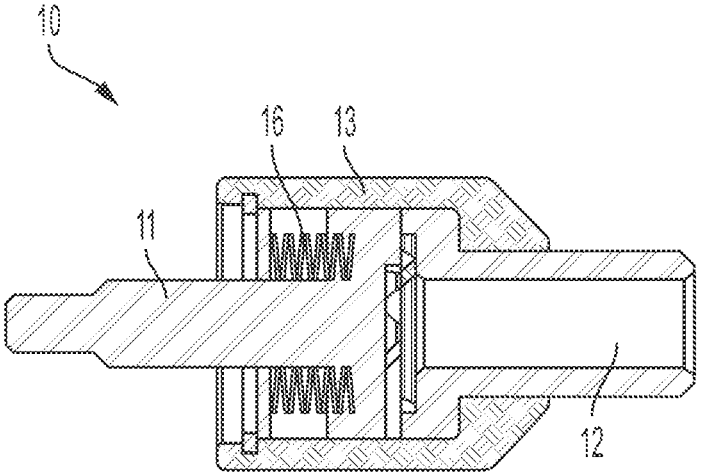
FIG. 4 is a cross-sectional view of FIG. 3 through A-A arrows.

FIGS. 3 and 4 illustrate, respectively, a side view of the steering decoupling device 10 of FIG. 1, and its cross-sectional view thereof through A-A arrows. As shown in FIG. 3, the output clutch jaw 11 and the input clutch jaw 12 are enclosed within the housing 13. Tensions between the output clutch jaw 11 and the input clutch jaw 12 are created by a disc spring 16 as best illustrated in FIG. 4. In one embodiment, the disc spring 16 may be a Belleville spring, a conical shaped disc that will deflect (flatten) at a given rate. The disc spring 16 may be made of steel or metal or other suitable material.

In one embodiment, a steering column decoupling system includes a steering shaft and an intermediate shaft, each having a clutch jaw. The clutch jaws may be coaxially mounted with respect to a rotatable decoupler shaft having another clutch jaw.

In one embodiment, the two shafts can translate relative to each other from a first position in which the first and second clutch jaws are engaged, to a second position in which the jaws are disengaged. For example, the intermediate shaft may include an output clutch jaw 11 and the steering shaft may include an input clutch jaw 12, with the two clutch jaws 11, 12 being part of a steering decoupling device 10 according to an embodiment disclosed herein.

Figure 5:
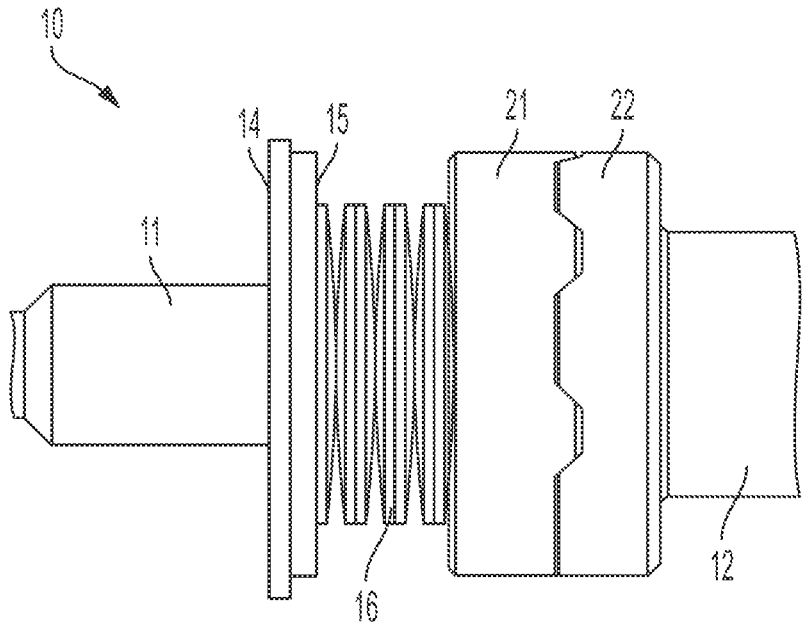
FIG. 5 is a cross-sectional view of the steering decoupling device in a coupled or engaged configuration.

In operation, the output clutch jaw 11 and the input clutch jaw 12 may be engaged or coupled in a first position as best illustrated in FIG. 5.

Figure 6:
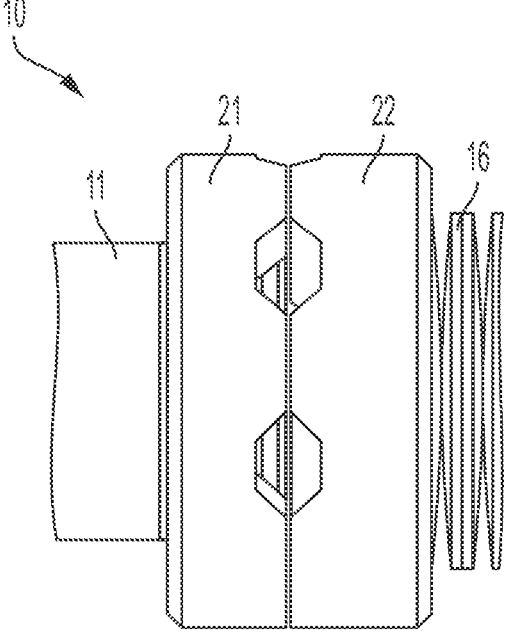
FIG. 6 is a cross-sectional view of the steering decoupling device in a decoupled or disengaged configuration.

In the alternative, the output clutch jaw 11 and the input clutch jaw 12 may be disengaged or decoupled in a second position as best illustrated in FIG. 6.

In one embodiment, the steering decoupling device 10 may include a housing 13 for housing at least a portion of the output clutch jaw 11 and the input clutch jaw 12 as well as the corresponding shafts. In some embodiments, the housing 13 may further be operable to urge the two clutch jaws 11, 12 into the first position (hence the two shafts).

In one embodiment, spring tension (e.g., disc spring 16) within the housing 13 creates engagement that is frangible in response to angular movement of the first decoupler shaft (e.g., steering shaft) relative to the second decoupler shaft (e.g., intermediate shaft) to release the axially compressive force, thereby permitting the first and second decoupler shafts to move into a second position (e.g., disengaged).

In FIG. 5, a cross-sectional view of the steering decoupling device 10 in a coupled or engaged configuration is shown. In this embodiment, the steering decoupling device 10 includes an output clutch jaw 11, with a thrust washer 15 secured by a heavy-duty internal retaining ring 14, adjacent the output clutch jaw 11 is the input clutch jaw 12 along with the disc spring 16, the various parts being similar to those described above. In this example, the housing 13 of the steering decoupling device 10 has been removed for ease of demonstrating the engagement mechanism between the clutch jaws 11, 12.

In this embodiment, the output clutch jaw 11 includes an alignment feature 21, and the input clutch jaw 12 also includes an alignment feature 22. In the coupled or engaged configuration, the alignment features 21, 22 are in complimentary alignment so as to enable engagement or coupling between the clutch jaws 11, 12. In operation, should the alignment features 21, 22 become disengaged or are no longer in alignment (fully discussed below), the re-alignment can only occur in a single orientation to thereby restore operational control to pre-conditional alignment.

In FIG. 6, a cross-sectional view of the steering decoupling device 10 in a decoupled or disengaged configuration is shown. Like above, the output clutch jaw 11 includes an alignment feature 21 and the input clutch jaw 12 also includes an alignment feature 22. As shown, however, the alignment features 21, 22 are not in alignment. The cause of such decoupling or disengagement of the alignment features 21, 22 may be by external forces (e.g., pneumatic, electrical). The external force may be exerted by manipulating the output clutch jaw 11, for example, by retracting the output clutch jaw 11, with regards to the input clutch jaw 12, so as to disengage the alignment features 21, 22 thereby creating independent rotations between the clutch jaws 11, 12. In another example, the external force may be exerted by manipulating the input clutch jaw 12 to disengage the alignment features 21, 22 thereby creating independent rotations. The independent rotations can serve to create autonomous control without interaction from the operator.

In one example, such as in agriculture, where injury or death could result from machinery that continues to rotate if extremities, phalanges or appendages were to become entrapped with rotational machinery, the decoupling device 10 would enable safe shutdown and removal of such obstruction due to its disengagement or decoupling feature.

In another example, such as in the wheels of an automobile, which can cause a sudden force through the rack and pinion steering. Rotational forces can be created that may cause injury and possibly fracture an operator's wrists, hands or other extremities within reasonable distance to the steering wheel. By using the decoupling device 10, which would result in disengagement of the clutch jaws 11, 12, the safe shutdown and removal of any obstruction can be carried out.

The benefits of this decoupler system include an ability to react unilaterally in either rotational direction, nondestructive, and enabling re-engagement of repetitive decoupling/re-coupling action, to name a few. In other words, the steering decoupling device 10 can be re-serviced by a user and used in perpetuity, without replacement for subsequent disengagements.

In the foregoing description, it will be readily appreciated by those skilled in the art that modifications may be made to the invention without departing from the concepts disclosed herein. Such modifications are to be considered as included in the following claims, unless the claims by their language expressly state otherwise.

What is claimed is:

1. A steering decoupling device comprising:
   an output clutch jaw;
   an input clutch jaw;
   a housing encompassing the output clutch jaw and the input clutch jaw;
   a thrust washer and a heavy-duty internal retaining ring for ensuring that the output clutch jaw is securely mounted within the housing;
   a disc spring residing within the housing configured to provide tension between the output clutch jaw and the input clutch jaw;
   an intermediate shaft that includes output clutch jaw; and
   a steering shaft that includes the input clutch jaw, the intermediate shaft and the steering shaft configured to translate relative to each other from a first position in which the output clutch jaw and the input clutch jaw are engaged to a second position in which the output clutch jaw and the input clutch jaw are disengaged.

\* \* \* \* \*